Patented Mar. 24, 1931

1,797,240

UNITED STATES PATENT OFFICE

EDWIN B. NEWTON, OF AKRON, OHIO, ASSIGNOR TO AMERICAN ANODE, INC., OF AKRON, OHIO, A CORPORATION OF DELAWARE

METHOD OF MANUFACTURING RUBBER ARTICLES

No Drawing.   Application filed March 6, 1929.  Serial No. 344,929.

This invention relates to the art of manufacturing rubber, and particularly to methods for manufacturing rubber articles containing two superimposed, adherent layers.

Rubber articles must frequently be made from two or more different layers, which are superimposed and vulcanized together to form an integral whole. Often the layers must exhibit different properties and are made of different rubber compositions. For example, an automobile tire contains a stiff wear-resisting tread composition, a soft cushion composition under the tread, and a tough elastic composition surrounding the cords of the carcass. The inner tube is made from a soft and elastic, but strong and tough, composition, while the valve pad attached thereto is made from a firm composition to resist cutting and tearing by the valve stem, and is further reinforced by fabric inserts.

Certain types of rubber compositions may be prepared very economically and of a surpassingly high quality directly from latex or similar rubber emulsions, the latex containing the necessary vulcanizing ingredients, fillers, etc. in suspension. Other compositions, however, are best prepared from rubber which is masticated and kneaded until it is plastic, and then mechanically admixed with the requisite vulcanizing ingredients, etc. Such masticated rubber has a very sticky or tacky surface before vulcanization; complete articles being readily built up by superimposing the constituent parts, which adhere quite firmly, even in the unvulcanized condition. Rubber which is derived directly from latex, without mastication, chemical depolymerization, or other similar process, whether formed by electrodeposition, coagulation, dessication, or any other process, lacks the tackiness of the masticated rubber and does not satisfactorily adhere, in the unvulcanized condition, to masticated rubber surfaces.

I have discovered that unvulcanized masticated rubber and unmasticated latex rubber may be caused to adhere firmly, one to the other, even before vulcanization, by superimposing the two layers after the latex rubber has been coagulated but before it is dry. The composite product is subsequently dried and vulcanized, whereupon the union between the two layers is strengthened and made permanent.

For example, in the manufacture of inner tubes directly from latex, the latex is admixed with the requisite proportions of sulphur, accelerator and other desirable additions, and is coagulated in substantially the ultimate shape which it is to assume. The coagulation may be induced by electro-deposition on a conducting mandrel immersed in the latex composition, but it will be understood that other methods of coagulation may likewise be employed. The valve pad which is to be affixed to the inner tube is manufactured in the well known manner by admixing rubber by mastication with the quantity of sulphur, accelerator, etc. which will vulcanize at the same rate as the inner tube proper, and forming the plastic admixture by calendaring or other convenient means into a pad reinforced with one or more layers of fabric. The said pad is thereupon affixed to the coagulated wet inner tube and pressed firmly into place. The pad adheres so firmly to the wet latex rubber that it cannot be removed therefrom without greatly damaging or tearing the rubber. If desired, a portion of the water contained in the latex rubber is expressed either before, during or after the application of the valve pad. This operation may conveniently be performed by affixing the valve pad to the wet inner tube while it is still on the mandrel, and wrapping the tube over its entire length with a cloth tape, the pressure of which simultaneously expresses a large part of the water from the wet rubber and unites the valve pad therewith. The tape is removed, the tube dried, and vulcanized by heating in steam or hot water for the required length of time.

It is obvious that the method of this invention is not limited to the example described above, but is applicable in any case in which it is necessary or desirable to adhere a layer of masticated rubber to a layer of unmasticated rubber directly derived from latex. It is therefore to be understood that it is not intended to limit the scope of this invention except as may be required by the prior art and as indicated in the appended claims.

I claim:

1. The method of manufacturing composite rubber articles which comprises superimposing a layer of plastic masticated rubber and a layer of coagulated wet latex rubber.

2. The method of manufacturing composite rubber articles which comprises superimposing a layer of plastic masticated rubber and a layer of coagulated wet latex rubber and uniting the layers by pressure.

3. The method of manufacturing composite rubber articles which comprises forming the elements thereof respectively from plastic masticated rubber and from latex by coagulation, and uniting the said elements while the coagulated latex rubber is still wet.

4. The method of manufacturing composite rubber articles which comprises forming the elements thereof respectively from plastic masticated rubber and from latex by coagulation, uniting the said elements while the coagulated latex rubber is still wet, and applying pressure to express a portion of the water from the latex rubber and to promote the union of the respective elements.

5. The method of manufacturing composite rubber articles which comprises forming the elements thereof respectively from plastic masticated rubber and from latex by coagulation, uniting the said elements while the latex rubber is still wet, and drying and vulcanizing the articles.

6. The method of manufacturing inner tubes which comprises forming a tube from latex by coagulation thereof, and affixing a valve pad of plastic, masticated rubber to the wet, coagulated tube.

7. The method of manufacturing inner tubes which comprises forming a tube from latex by coagulation thereof, affixing a valve pad of plastic, masticated rubber to the wet, coagulated tube, and applying a substantially uniform pressure to the surface of the tube to express a portion of the water therefrom and promote the union of the valve pad with the latex rubber.

8. The method of manufacturing inner tubes which comprises forming a tube from latex by coagulation thereof, affixing a valve pad of plastic, masticated rubber to the wet coagulated tube, and drying and vulcanizing the tube.

9. The method of manufacturing inner tubes which comprises forming a tube from latex by coagulation thereof, affixing a valve pad of plastic, masticated rubber to the wet, coagulated tube, applying a substantially uniform pressure to the surface of the tube to express a portion of the water therefrom and promote the union of the valve pad with the latex rubber, and drying and vulcanizing the tube.

In witness whereof I have hereunto set my hand this 2nd day of March, 1929.

EDWIN B. NEWTON.